(12) United States Patent
Sawashima et al.

(10) Patent No.: US 7,752,217 B2
(45) Date of Patent: Jul. 6, 2010

(54) SEARCH DEVICE

(75) Inventors: Nobuyuki Sawashima, Ota-ku (JP);
Takashi Suzuoka, Yokohama (JP);
Akira Mase, Yokohama (JP)

(73) Assignee: NewsWatch, Inc., Tokyo (JP)

( * ) Notice: Subject to any disclaimer, the term of this patent is extended or adjusted under 35 U.S.C. 154(b) by 528 days.

(21) Appl. No.: 10/982,899

(22) Filed: Nov. 8, 2004

(65) Prior Publication Data
US 2006/0074884 A1  Apr. 6, 2006

(30) Foreign Application Priority Data
Sep. 28, 2004  (JP)  ............... 2004-282527

(51) Int. Cl.
*G06F 17/30* (2006.01)
*G06F 17/00* (2006.01)
(52) U.S. Cl. ................... 707/760; 709/217
(58) Field of Classification Search ......... 707/100, 707/104.1
See application file for complete search history.

(56) References Cited

U.S. PATENT DOCUMENTS

| | | | | |
|---|---|---|---|---|
| 6,421,675 | B1* | 7/2002 | Ryan et al. ................ | 707/3 |
| 7,185,001 | B1* | 2/2007 | Burdick et al. ............ | 707/3 |
| 2002/0042789 | A1* | 4/2002 | Michalewicz et al. ..... | 707/3 |
| 2002/0073056 | A1* | 6/2002 | Broster et al. ............. | 707/1 |
| 2002/0087550 | A1* | 7/2002 | Carlyle et al. ............ | 707/10 |
| 2002/0099723 | A1* | 7/2002 | Garcia-Chiesa .......... | 707/200 |
| 2003/0204501 | A1* | 10/2003 | Moon ...................... | 707/3 |
| 2004/0143644 | A1* | 7/2004 | Berton et al. ............. | 709/217 |
| 2004/0260730 | A1* | 12/2004 | Iwama .................... | 707/104.1 |
| 2006/0230021 | A1* | 10/2006 | Diab et al. ............... | 707/3 |

FOREIGN PATENT DOCUMENTS

| | | |
|---|---|---|
| JP | 2003-132060 | 5/2003 |
| JP | 2003-150624 | 5/2003 |
| JP | 2003-157283 | 5/2003 |
| JP | 2003-203032 | 7/2003 |

* cited by examiner

*Primary Examiner*—Tony Mahmoudi
*Assistant Examiner*—Michele C Choi
(74) *Attorney, Agent, or Firm*—Oblon, Spivak, McClelland, Maier & Neustadt, L.L.P.

(57) ABSTRACT

A search device and a search program for searching an identifier of a site server, which provides information corresponding to a search format including an inputted keyword. Specifically, the search device includes: a search database storage which stores a search database; a conversion program storage which stores a conversion program and the identifier of the site server by associating them with each other; a search unit which reads the search database storage and searches the identifier of the site server corresponding to the inputted search format; and a site search link generation unit which reads the conversion program storage, selects a conversion program while the conversion program is associated with the identifier of the site server, which is searched by the search unit, and uses the selected conversion program to convert the inputted search format into the identifier of the site search server attached to the site server.

5 Claims, 6 Drawing Sheets

|  | KEYWORD | URL | DISPLAY ATTRIBUTE |
|---|---|---|---|
| 001 | *** | *** | *** |
| 002 | *** | *** | *** |
| 003 | *** | *** | *** |
| 004 | *** | *** | *** |
| ... | ... | ... | ... |

| RECORD NUMBER | 001 | 002 | 003 | ... |
|---|---|---|---|---|
| URL | *** | *** | *** | ... |
| CONVERSION PROGRAM | *** | *** | *** | ... |
| DISPLAY ATTRIBUTE | *** | *** | *** | ... |
| HIDDEN FLAG | 1 | 0 | 1 | ... |

SEARCH DEVICE

CROSS REFERENCE TO RELATED APPLICATION

This application claims benefit of priority under 35 U.S.C §119 to Japanese Patent Application No. 2004-282527, filed on Sep. 28, 2004, the entire contents of which are incorporated by reference herein.

BACKGROUND OF THE INVENTION

1. Technical Field

The present invention relates to a search device and a search program for searching an identifier of a site server which provides information corresponding to a search format including an inputted keyword.

2. Background Art

In searching for information such as search for material and simple research through the Internet, search engines for searching sites providing the information have been widely used. In such search engines, a search format such as a keyword is inputted by an operator. In this search engine, there has been used a technology for searching information corresponding to the inputted search format from information previously stored in a database of the search engine.

However, search engines provided in sites run by companies, organizations, individuals and the like have dedicated fields, respectively, and have databases of information specialized for those fields. Meanwhile, for sites run by a plurality of companies, organizations, individuals and the like, in a database of a search engine for searching sites providing predetermined information, it is difficult to previously store all information which can be provided by respective site servers and to provide results obtained by searching for information on all the dedicated fields exhaustively. Thus, the operator is made to search for information to be searched, by use of search engines different from each other for each of the dedicated fields.

In general, vast amounts of information are searched by search engines, and unnecessary information is also included therein. Thus, it is difficult for the operator to extract only useful information from the information searched.

In order to respond to such problems, there is also an invention capable of searching useful information for an operator in such a manner that a search is conducted by use of a plurality of search engines, a category by which information will be searched is previously selected as a search criteria by the operator, and information corresponding to the selected category is extracted (for example, Japanese Patent Laid-Open No. 2003-157283).

In the above-described invention described in Japanese Patent Laid-Open No. 2003-157283, the information corresponding to the selected category can be extracted. However, it is previously specified search engines that will search for information. Thus, the quality of information obtained as a search result depends on accuracy of these search engines.

BRIEF SUMMARY OF THE INVENTION

In consideration for the foregoing problems, an object of the present invention is to provide a search device and a search program for displaying a search result as well as an identifier of an site search uniquely set in a searched site.

In order to solve the foregoing problems, a search device according to an aspect of the present invention, which searches an identifier of a site server corresponding to an inputted search format, includes: a search database storage which stores a search database for searching information retained by a plurality of site servers; a conversion program storage which stores a conversion program for converting the search format into an identifier of an site search server attached to the site server, and the identifier of the site server by associating them with each other; a search unit which reads the search database storage and searches the identifier of the site server corresponding to the inputted search format; an site search link generation unit which reads the conversion program storage, selects a different conversion program for each site search server while the conversion program is associated with the identifier of the site server, which is searched by the search unit, and uses the selected conversion program to convert the inputted search format into the identifier of the site search server attached to the site server; and a search result generation unit which generates a search result corresponding to the inputted search format, the result containing the identifier of the site search server attached to the site server, which is generated by the site search link generation unit.

The nature, principle and utility of the invention will become apparent from the following detailed description when read in conjunction with the accompanying drawings.

DETAILED DESCRIPTION OF THE INVENTION

Next, with reference to the drawings, a search device 1 according to an embodiment of the present invention will be described.

Figure 1:
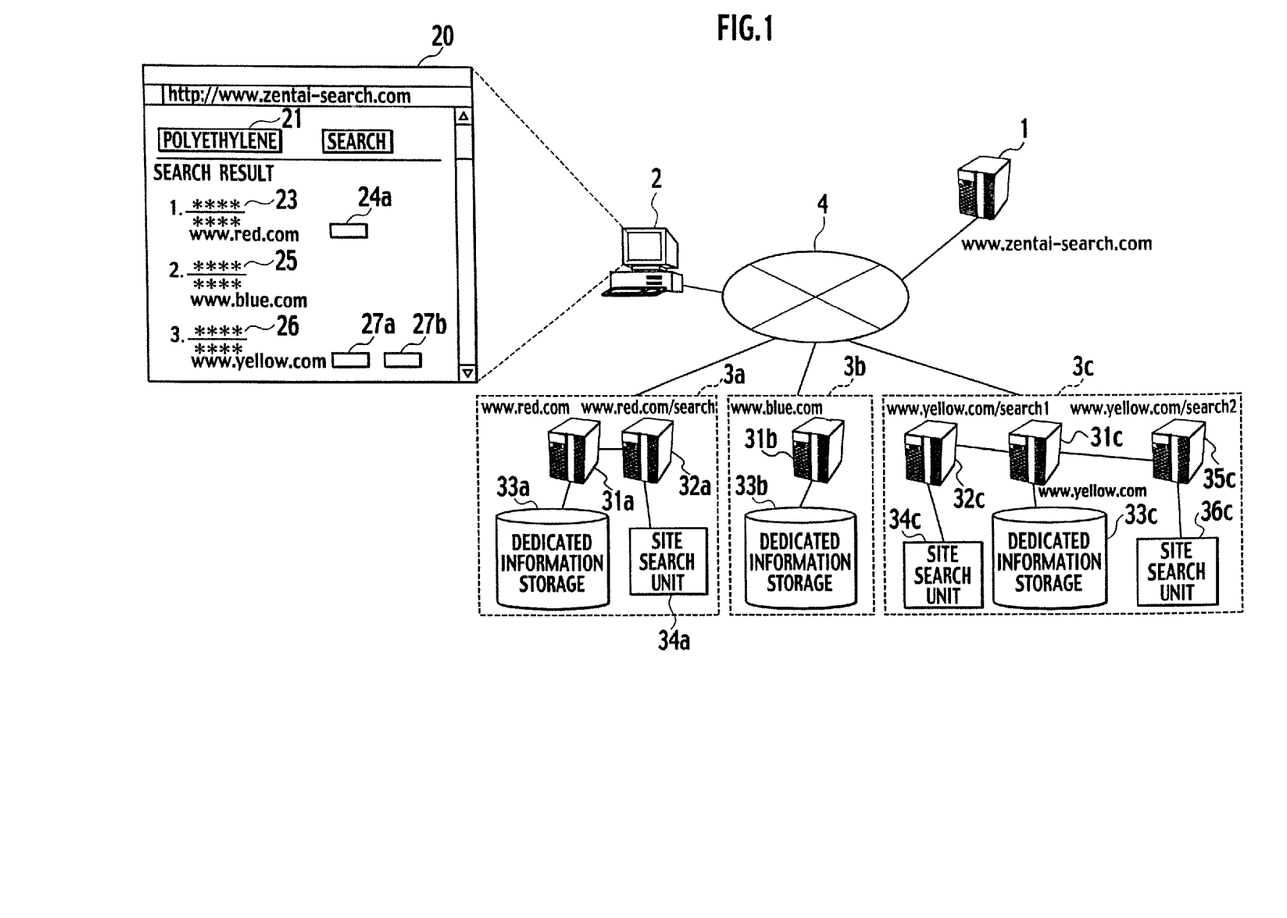
FIG. 1 is a view showing a search device according to an embodiment of the present invention.

As shown in FIG. 1, the search device 1 according to the embodiment of the present invention is connected to a client terminal 2 and search site systems 3a to 3c through a network 4.

The search device 1 according to the embodiment of the present invention receives a search request which is inputted by an operator from the client terminal 2 through the communication network 4 such as an Internet. Upon receipt of the search request, the search device 1 executes search processing based on the inputted search request. Moreover, the search device 1 outputs a search result obtained by execution of the search processing, as an HTML output file, to the client terminal 2 through the network 4. Note that, although the search device 1 and the client terminal 2 have different configurations in the example shown in FIG. 1, a stand-alone configuration may be adopted.

The client terminal 2 analyzes the HTML output file received from the search device 1 and creates a display screen 20 by use of preinstalled browser software. The client terminal 2 displays the created display screen 20 on a display unit.

The search site system 3a has a site server 31a and an site search server 32a. The site search server 32a searches contents provided by the site server 31a. Note that the site search server 32a may be also provided by an ASP service. The site server 31a has a dedicated information storage 33a. The dedicated information storage 33a stores dedicated information for forming a display screen to be displayed on the client terminal 2 to be connected. The site search server 32a has site search unit 34a. When an site search is executed, the site search unit 34a searches through the dedicated information storage 33a, which can be read by the site search unit 34a, for an inputted keyword.

A site is web pages in one bundle, and is a location on the Internet that web page group is provided. The site is identified by URL, a domain and the like. Web pages in the site are connected to each other with a link. In the search site systems 3a to 3c providing the site, released web pages be update by the operator. The site includes the top page file that is an entrance of a site, a serial web page file composing the site, a picture file and the like. In this embodiment of the present invention, the search site systems 3a to 3c include a site that provides dedicated information in each other.

When key words are inputted by the client terminal 2, a site search is a process to search an identifier, URL of web page and the like, associated with the key words from the web pages that the search site system 3a composes the site and output the identifier.

Note that the search site systems 3b and 3c have the same configurations as that of the search site system 3a. The search site system 3b is different from the search site system 3a in having no site search server. Moreover, the search site system 3c is different from the search site system 3a in having two site search servers 32c and 35c. When an site search is executed, respective site search unit 34c and 36c search for dedicated information in the dedicated information storage 33c, respectively, in accordance with predetermined rules.

For example, as shown in FIG. 1, in the display screen 20 displayed on the client terminal 2, links 23, 25 and 26 are provided. The links 23, 25 and 26 include information on URLs which are identifiers of the site servers 31a to 31c, the identifiers being searched by the search device 1 based on a search format inputted to a keyword input portion 21. When one of these links 23, 25 and 26 are selected by the operator, the information on the URLs indicated by the selected link is obtained and displayed on the display screen 20.

Moreover, the display screen 20 has site search links 24a, 27a and 27b. The site search links 24a, 27a and 27b include information on URLs for conducting site searches within sites of the provided site servers 31a and 31c. To be more specific, when the site search link 24a is clicked by the operator, the site search unit 34a of the search site system 3a starts the site search.

When the site search is executed, the site servers 31a and 31b are searched based on the dedicated information stored in any one or more of the dedicated information storages 33a to 33c provided in the respective site servers. Thus, according to the site search, it is made possible to conduct specialized searches for information of the respective site servers.

Figure 2:
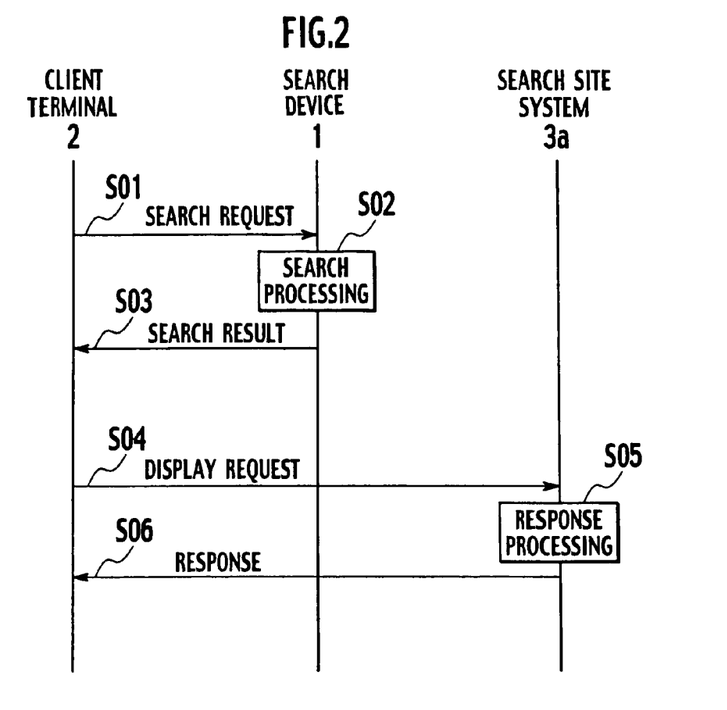
FIG. 2 is a view showing processing in the search device according to the embodiment of the present invention.

With reference to FIG. 2, description will be given of a flow of processing in the search device 1, the client terminal 2 and the search site systems 3a to 3c according to the embodiment of the present invention.

Upon receipt of a search request from the client terminal 2 through the network 4 (S01), the search device 1 executes search processing (S02). The search device 1 generates an HTML output file based on a search result obtained by execution of the search processing. The search device 1 outputs the generated output file to the client terminal 2 (S03).

The client terminal 2 uses preinstalled browser software to display a display screen 20 on a display unit based on the output file received from the search device 1. The client terminal 2 transmits a search request based on the displayed display screen 20 and an operation by the operator (S04).

In the example shown in FIG. 1, when the site search link 24a is clicked by the operator, the client terminal 2 transmits a search request to the search site system 3a. In response to the search request received from the client terminal 2, the site search unit 34a executes response processing of searching information corresponding to a search format inputted within a site (S05). When the site search unit 34a extracts dedicated information as the response processing, the site search unit 34a transmits an HTML file including this dedicated information to the client terminal 2, as a response to the search request (S06).

The site search unit 34a executes an site search, by referring to the dedicated information storage 33a and extracting dedicated information provided in the search site system 3a. To be more specific, the site search unit 34a searches for dedicated information stored in the dedicated information storage 33a based on a keyword inputted from the client terminal 2. Thereafter, the site search unit 34a generates a file to be transmitted to the site server, based on the searched dedicated information.

<Search Device>

Figure 3:
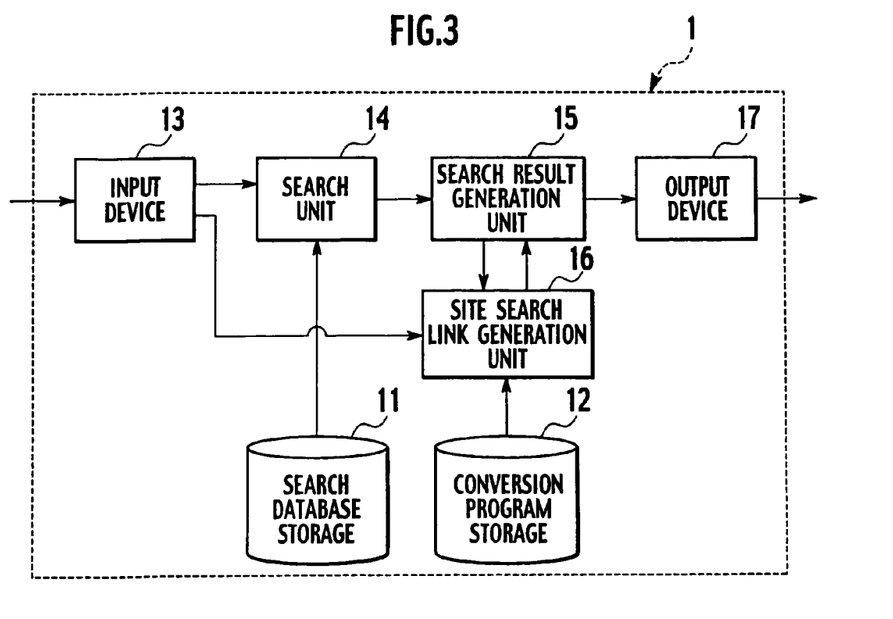
FIG. 3 is a block diagram of the search device according to the embodiment of the present invention.

As shown in FIG. 3, the search device 1 according to the embodiment of the present invention includes a search database storage 11, a conversion program storage 12, an input device 13, a search unit 14, a search result generation unit 15, an site search link generation unit 16 and an output device 17.

Figure 4:
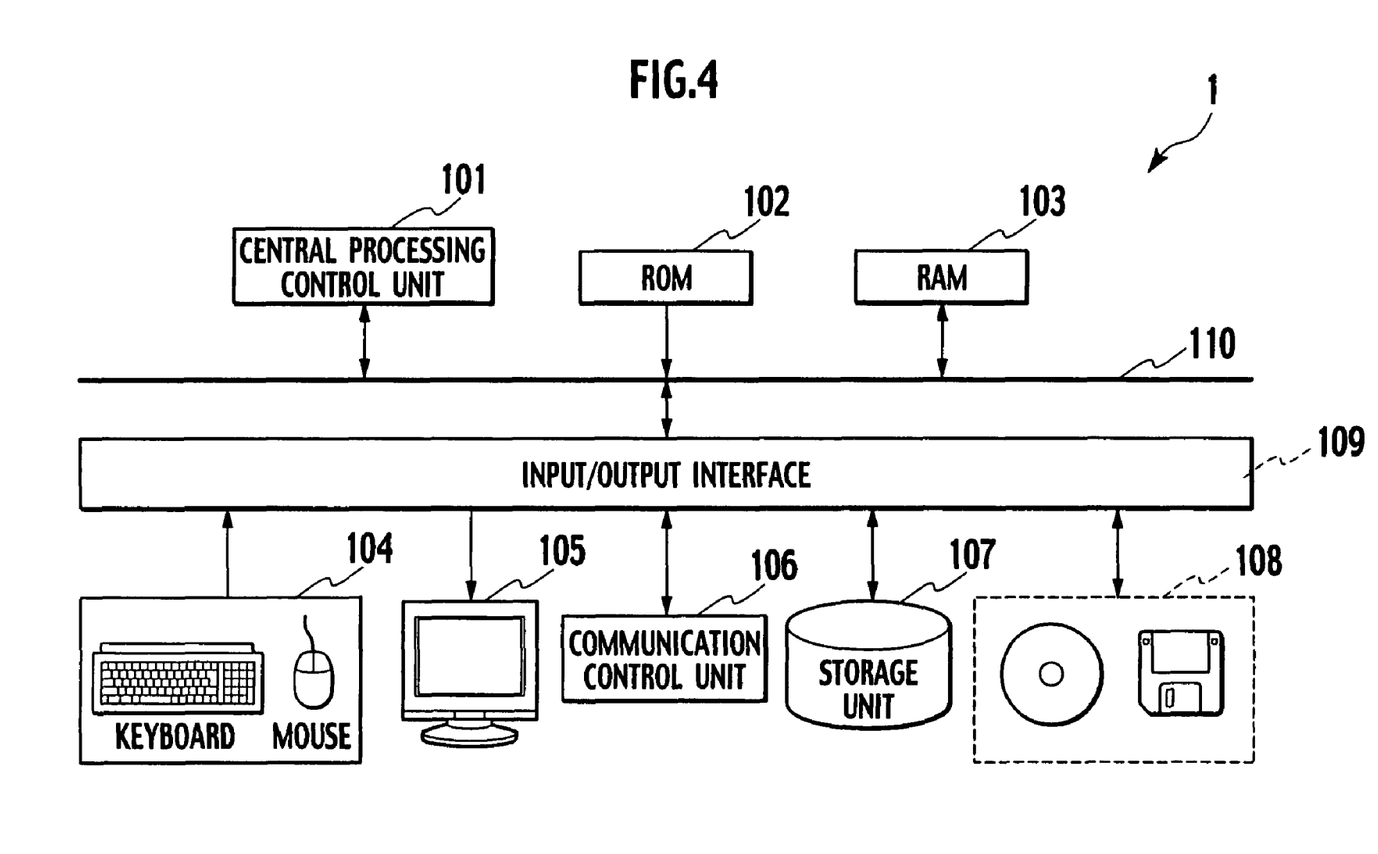
FIG. 4 is a view showing the search device according to the embodiment of the present invention.

As shown in FIG. 4, in the search device 1 according to the embodiment of the present invention, a central processing control unit 101, a ROM (Read Only Memory) 102, a RAM (Random Access Memory) 103 and an input/output interface 109 are connected to each other through a bus 110. To the input/output interface 109, an input unit 104, a display unit 105, a communication control unit 106, a storage unit 107 and a removable disk 108 are connected.

The central processing control unit 101 reads a boot program for starting the search device 1 from the ROM 102 based on an input signal from the input unit 104 and executes the program. Moreover, the central processing control unit 101 reads an operating system stored in the storage unit 107. Furthermore, the central processing control unit 101 controls the respective units based on input signals from the input unit 104, the communication control unit 106 and the like. Moreover, the central processing control unit 101 is a processing unit which reads programs and data which are stored in the RAM 103, the storage unit 107 and the like and loads the programs and data into the RAM 103. In addition, the central processing control unit 101 is a processing unit which realizes a series of processing to be described later, such as calculations or processing of data, based on a command of a program read from the RAM 103.

The input unit 104 is formed of input devices such as a keyboard and a mouse which are used by the operator to input various operations. The input unit 104 generates an input signal based on the operation by the operator. The generated input signal is transmitted by the input unit 104 to the central processing control unit 101 through the input/output interface 109 and the bus 110. The display unit 105 is a CRT (Cathode Ray Tube) display, a liquid crystal display or the like. The display unit 105 is a unit which receives an output signal to be displayed on the display unit 105 from the central processing control unit 101 through the bus 110 and the input/output interface 109 and displays, for example, a processing result of the central processing control unit 101 and the like. The communication control unit 106 is a unit such as LAN card, a modem or the like, and is a unit which connects the search device 1 to a communication network such as the Internet and a LAN. Data transmitted/received to/from the communication network through the communication control unit 106 is transmitted/received, as an input signal or an output signal, to/from the central processing control unit 101 through the input/output interface 109 and the bus 110.

The storage unit 107 is a semiconductor storage unit, a magnetic disk unit or the like, and stores data and programs to be executed by the central processing control unit 101. The removable disk 108 is an optical disk or a flexible disk. A signal read/written by a disk drive is transmitted/received to/from the central processing control unit 101 through the input/output interface 109 and the bus 110. In the storage unit 107 of the search device 1 according to the embodiment of the present invention, search programs, the search database storage 11 and the conversion program storage 12 are stored. Moreover, by reading this search program into the central processing control unit 101 of the search device 1 and executing the program, the input device 13, the search unit 14, the search result generation unit 15, the site search link generation unit 16 and the output device 17 are implemented.

Note that the search device 1 according to the embodiment of the present invention may be realized by use of one computer. Moreover, the search device 1 may be realized by use of a plurality of computers capable of communicating with each other.

Figure 5:
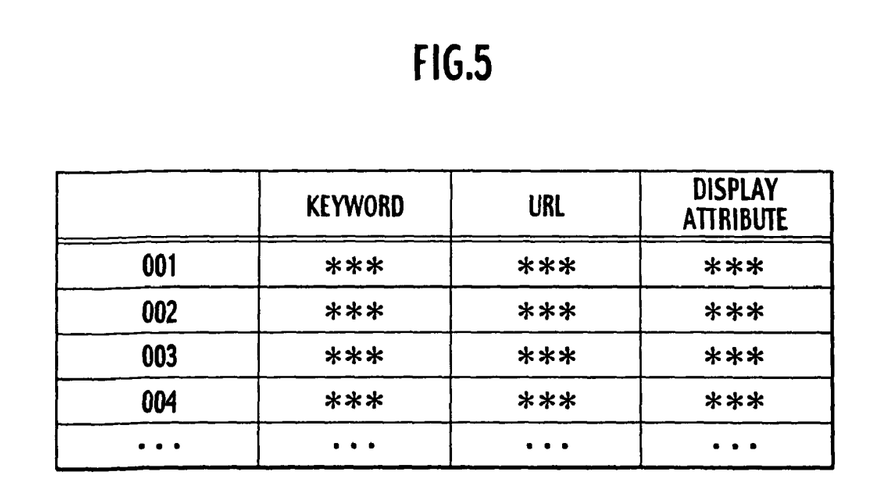
FIG. 5 is a view showing a search database of the search device according to the embodiment of the present invention.

The search database storage 11 stores a search database for searching site servers. For example, as shown in FIG. 5, the search database storage 11 stores a search database in which a plurality of keywords used in searching, URLs and display attributes are associated with each other. In creating the display screen 20 from the HTML file, the display attributes specify a title to be put in the display screen 20, character strings of descriptions of a search result or the like, logo images and the like. In the case of the display screen 20 shown in FIG. 1, the display attributes are data specifying the links 23, 25 and 26 for displaying information on searched URLs.

Figure 6:
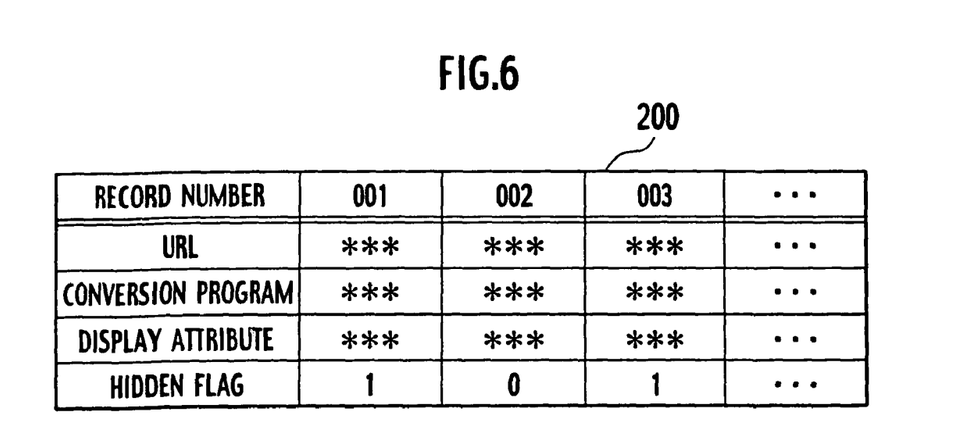
FIG. 6 is a view showing a conversion program storage of the search device according to the embodiment of the present invention.

The conversion program storage 12 stores a conversion program for converting a search format into a conformable search format to an site search server in association with a URL which is an identifier of a site server connecting to the site search server. To be more specific, as shown in FIG. 6, the conversion program storage 12 stores a plurality of records 200 in which conversion programs, display attributes and hidden flags are associated with URLs.

The conversion program converts an inputted search format. To be more specific, the conversion program is a program which generates a CGI argument for calling up a search CGI of the site server 31a and generates a URL including this CGI argument. Moreover, in creating the display screen 20 from the HTML file, the display attributes specify a title to be put in the display screen 20, character strings of descriptions of dedicated sites or the like, logo images and the like. In the case of the display screen 20 shown in FIG. 1, the display attributes are data specifying the site search links 27a and 27b which are linked to searches inside a site searched. The hidden flag determines whether or not the URL associated with this record is displayed as a URL for an site search associated with information of a search result for an inputted keyword.

Here, to set the hidden flag to ON means to set actual data for a hidden flag item to, for example, "1 (true)" and not to display the URL for the site search for the inputted keyword. To be more specific, when the hidden flag is set to ON, that is, to "1", a URL associated with this record is not displayed as a search result for an site search. Moreover, when the hidden flag is set to OFF, that is, to "0", a URL associated with this record is displayed as a search result for an site search.

The input device 13 inputs a search format to be inputted by the operator using the input unit 104. This search format includes a keyword to be inputted as an object to be searched at least when the operator searches for information.

The search unit 14 retrieves a search database from the search database storage 11 based on the search format inputted to the input device 13, and searches for a corresponding URL. The search unit 14 describes the searched URL and generates a search result list. To be more specific, the search unit 14 refers to the search database and extracts only a URL, which is associated with the keyword included in the search format inputted to the input device 13 and is selected based on the search format. The search unit 14 generates a search result list describing the extracted URL.

For the URL extracted by the search unit 14, the search result generation unit 15 generates an output file based on rules converted by the site search link generation unit 16. Specifically, for the URL described in the search result list received from the search unit 14, the search result generation unit 15 generates an output file describing a URL searched by use of the rules converted by the site search link generation unit 16 and display attributes stored in the search database storage 11 in association with the searched URL. Moreover, if no URL exists in the search result list, the search result generation unit 15 generates an output file in which no relevant search result exists. To be more specific, these output files are described in HTML format, read by a browser of the client terminal 2 and displayed.

The site search link generation unit 16 compares a URL to be set as a key in the conversion program storage 12 with the URL searched by the search unit 14. When a URL is extracted by a matching rule predetermined by the comparison, the site search link generation unit 16 generates a URL by executing a conversion program. Thereafter, the site search link generation unit 16 generates a result list describing the generated URL.

The output device 17 outputs the output file generated by the search result generation unit 15 to the display unit 105 and the like.

<Search Processing>

Figure 7:
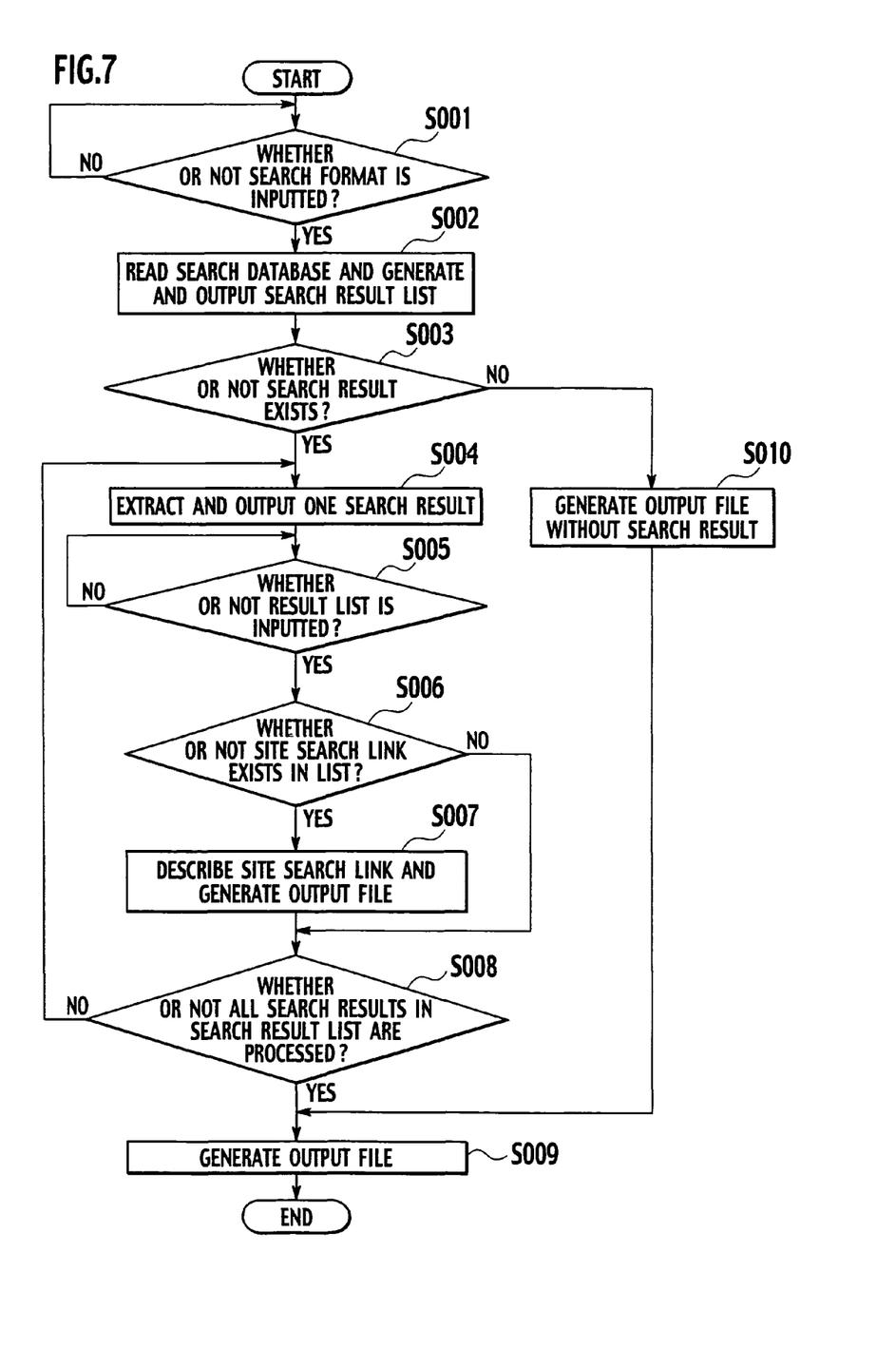
FIG. 7 is a view showing search processing of the search device according to the embodiment of the present invention.
Figure 8:
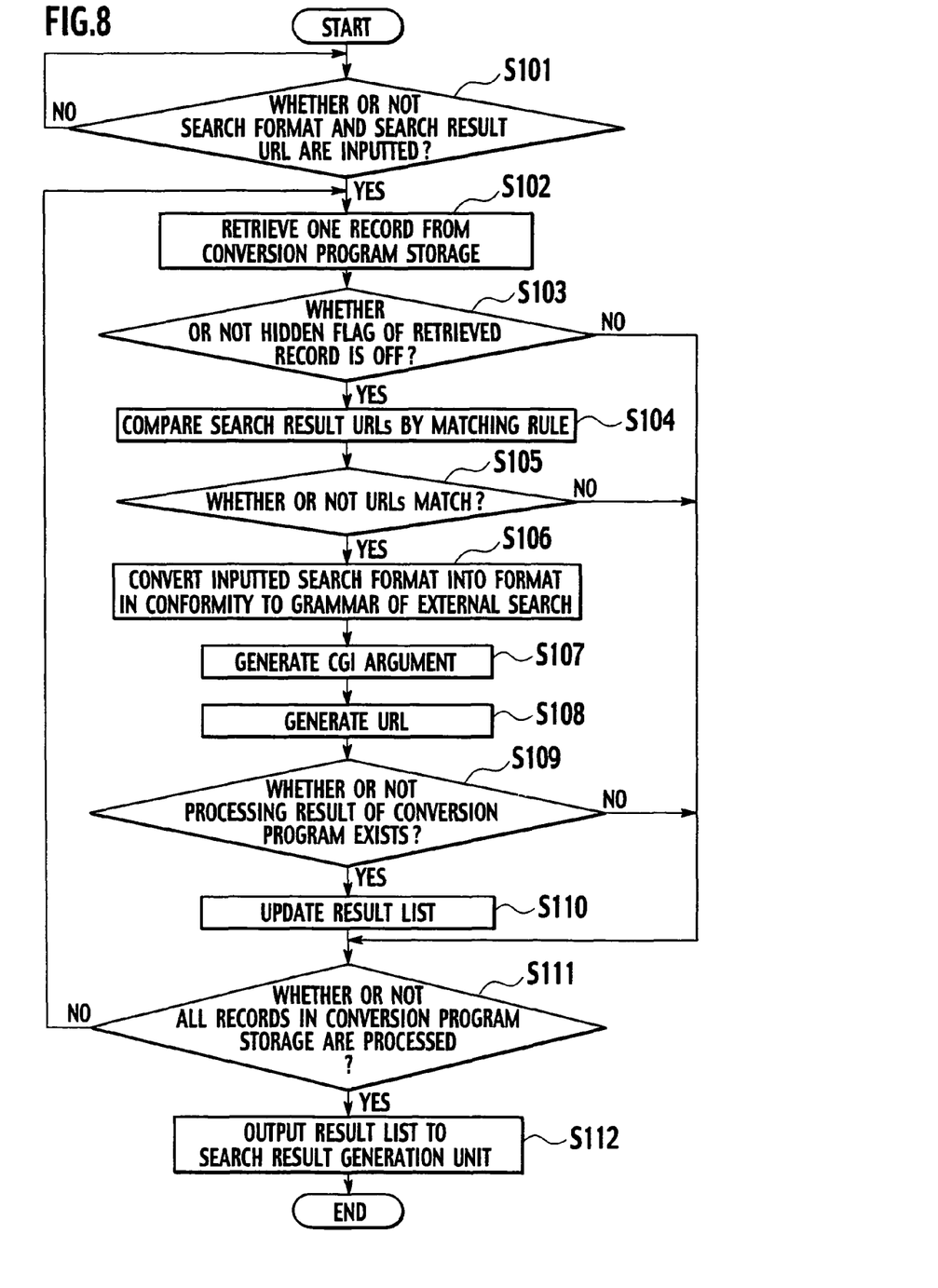
FIG. 8 is a view showing result list generation processing of the search device according to the embodiment of the present invention.

Next, with reference to flowcharts shown in FIGS. 7 and 8, description will be given of a flow of search processing in the search device 1 according to the embodiment of the present invention.

When the operator inputs a search format through the input device 13 by means of the input unit 104 (YES in S001), the search unit 14 retrieves a search database from the search database storage 11 and searches for a URL associated with the inputted search format. Thereafter, the search unit 14 generates a search result list and outputs the list to the search result generation unit 15 (S002). In the search result list, described are the searched URL and display attributes stored in the conversion program storage 12 in association with the searched URL.

For example, when "polyethylene" is inputted as a keyword representing information to be searched by the operator, a search result list is generated by including a URLs associated with this keyword "polyethylene" as actual data.

If a URL exists, as a search result, in the search result list received from the search unit 14 (S003), the search result generation unit 15 extracts a search result related to one URL from the search result list. The search result generation unit 15 outputs the extracted search result of the URL to the site search link generation unit 16 (S004). Here, the extracted search result includes, in addition to the URL, display attributes such as a title of this site and descriptions thereof.

Next, for this outputted URL, the search result generation unit 15 waits for an input of a result list generated by associating URLs with display attributes from the site search link generation unit 16 (S005). When the result list is inputted from the site search link generation unit 16, the search result generation unit 15 determines whether or not a URL linked to an site search exists in the inputted result list (S006).

If an site search link exists in the result list in Step S006, the search result generation unit 15 generates an output file describing the URL linked to the site search and display attributes (S007). Note that, if, in generating the output file, there exist a plurality of URLs linked to the site searches in the result list, the search result generation unit 15 may generate the output file by describing URLs linked to all the site searches. Alternatively, the search result generation unit 15 may generate the output file by describing only URLs linked to a specified number of site searches.

Subsequently, the search result generation unit 15 determines whether or not the steps from S004 to S007 are performed for all search results in the search result list (S008). If there exists a list which has not yet been processed, the processing returns to Step S004, and the search result generation unit 15 extracts other search results from the search result list and repeats the same processing.

As described above, in Step S004, the search result generation unit 15 sequentially takes out one by one the search results of the URLs which has been extracted from the result list inputted from the search unit 14, and outputs the results to the site search link generation unit 16. Thus, the search result generation unit 15 can determine whether or not there exist site search links for all the URLs included in the search result list and can generate the output file.

Meanwhile, if, in Step S008, the processing has been performed for all the search results in the search result list, the output device 17 outputs the output file generated in Step S007 (S009).

Moreover, if, in Step S003, there exists no search result in the search result list inputted from the search unit 14, the search result generation unit 15 generates an output file indicating that there is no search result (S010). The output device 17 outputs the output file generated by the search result generation unit 15 (S009).

<Result List Generation Processing in Search Processing>

Next, description will be given of processing of inputting search results to the site search link generation unit 16 from the search result generation unit 15 in the processing of Step S004, and of generating a result list to be inputted to the search result generation unit 15 in Step S005 by the site search link generation unit 16.

When the search format is inputted from the search unit 14 and the URL of the search result outputted in Step S004 is inputted from the search result generation unit 15 (S101), the site search link generation unit 16 retrieves one record from the conversion program storage 12 (S102).

A hidden flag of the record retrieved by the site search link generation unit 16 is referred to. If the hidden flag of the retrieved record is OFF (S103), the site search link generation unit 16 compares the URL of the search result inputted in Step S101 with a URL described in the record (S104). For example, as a matching rule of a comparison method of URLs, a comparison method by use of front matching is used.

If the URL of the search result and the URL described in the record match in the comparison in Step S104 (YES in S105), the site search link generation unit 16 allows a conversion program described in the record to process the search format inputted from the search unit 14.

Specifically, first, the site search link generation unit 16 converts the search format inputted from the input device 13 into a format in conformity to grammar of an site search, based on the conversion program (S106).

For example, if an operator in conformity to grammar of an original search format is "AND", whereas a corresponding operator in conformity to grammar of a search format in an site search is "&", the site search link generation unit 16 converts "AND" into "&". Moreover, if an operator in conformity to the grammar of the original search format is "OR", whereas a corresponding operator in conformity to the grammar of the search format in the site search is "|", the site search link generation unit 16 converts "OR" into "|". Furthermore, if an operator in conformity to the grammar of the original search format is "NOT", whereas a corresponding operator in conformity to the grammar of the search format in the site search is "−", the site search link generation unit 16 converts "NOT" into "−".

For example, in the case where there exists "NOT" in the grammar of the original search format, but there is nothing relevant in the grammar of the search format in the site search, that is, there is nothing which grammatically matches "NOT", the site search link generation unit 16 ignores a portion in which "NOT" acts. Alternatively, in the case where there exists "NOT" in the grammar of the original search format, but there is nothing relevant in the grammar of the search format in the site search, that is, there is nothing which grammatically matches "NOT", the site search link generation unit 16 makes an adjustment by setting "no conversion result".

Next, the site search link generation unit 16 generates a CGI argument based on the conversion program (S107). Specifically, although site searches are called up as CGIs, arguments thereof are different from each other. Thus, the site search link generation unit 16 generates a CGI argument for calling up a search CGI of the site server 31*a* by putting in the search format converted in Step S106 so as to conform to an site search which is a target.

Subsequently, the site search link generation unit 16 generates a URL based on the conversion program (S108). Specifically, the argument generated in Step S107 is associated with a CGI name, and thus obtaining a URL for executing an site search.

If there exist processing results by the conversion program (YES in S109), the site search link generation unit 16 updates the result list by adding site search links which are the processing results, and relevant display attributes, in the result list (S110).

Subsequently, the site search link generation unit 16 confirms whether or not all the records in the conversion program storage 12 have been processed (S111). If all the records have been processed, the site search link generation unit 16 outputs the search list to the search result generation unit 15(S112). Meanwhile, if it is confirmed in Step S111 that not all the records have been processed, the processing returns to Step S102, and the site search link generation unit 16 repeats the same processing up to Step S110.

Moreover, if there exists no processing result by the conversion program in Step S109, there exist no site search links and display attributes which will be added to the search list. Thus, the site search link generation unit 16 advances to the processing of Step S111.

As described above, the search device 1 according to the embodiment of the present invention can display a URL of an site search of a extracted site server simultaneously with a search result.

It should be understood that many modifications and adaptations of the invention will become apparent to those skilled in the art and it is intended to encompass such obvious modification and changes in the scope of the claims appended hereto.

What is claimed is:

1. A search device, comprising:
    an input unit configured to input a search formula that is transmitted by a client terminal and includes one or more keywords in a first format;
    a search information storage unit which stores a plurality of URLs of a plurality of site servers, and keywords for each URL that relate to information provided by a corresponding site server;
    a conversion program storage unit which stores a record corresponding to one of the site servers to which a site search server and dedicated information storage are attached, the record including a URL of the one of the site servers and a conversion program, the site search server executing a site search for searching the dedicated information storage in response to a request for the site search, and the conversion program being used (a) for converting the first format of the search formula into a second format in conformity to a grammar of the site search executed by the site search server, and (b) for generating a site search identifier including the search formula in the second format and a CGI (common gateway interface) name causing the site search server to execute the site search based on the search formula in the second format;
    a search unit which searches URLs corresponding to the search formula in the first format from the search information storage unit, to obtain searched URLs;
    a link generation unit configured to (a) compare each of the searched URLs with the URL included in the record stored in the conversion program storage unit, to obtain one of the searched URLs which is matched with the URL included in the record, (b) obtain the conversion program from the record, (c) convert, using the obtained conversion program, the first format of the search formula into the second format, and (d) generate, using the obtained conversion program, the site search identifier including the CGI name and the search formula in the second format;
    a search result generation unit configured to generate a first search result as a response to the search formula in the first format, the first search result including a first link designating the one of the searched URLs and enabling the client terminal to click through to the information of the one of the site servers, and a second link designating the site search identifier and enabling the client terminal to request the site search server to execute the site search; and
    an output unit configured to output the first search result to the client terminal.

2. The search device according to claim 1, wherein the link generation unit obtains the one of the searched URLs which is matched with a front of the URL included in the record.

3. The search device according to claim 1, wherein the search information storage unit stores, for each URL of the URLs, a display attribute that corresponds to the URL and indicates display information on the URL.

4. The search device according to claim 1, wherein:
    when the second link is clicked at the client terminal, at least the CGI name and the search formula in the second format is transmitted as the request for the site search to the site search server;
    the site search is executed on the site search server based on the search formula in the second format to obtain a second search result including a link to dedicated information which is searched from the dedicated information storage; and
    the second search result is transmitted to the client terminal.

5. The search device according to claim 1, wherein the search formula inputted by the input unit includes one or more keywords and one or more operators in the first format; and
    the link generation unit converts the operators in the first format into other operators in conformity to the grammar of the site search executed by the site search server attached to the one of the site servers.

* * * * *